United States Patent [19]

Urban et al.

[11] Patent Number: 5,022,516
[45] Date of Patent: Jun. 11, 1991

[54] SUBSTANTIALLY RECTANGULAR STORAGE CONTAINER, IN PARTICULAR FOR FLAT ARTICLES

[75] Inventors: Otfried Urban, Wiesbaden; Dieter Koob, Worms, both of Fed. Rep. of Germany

[73] Assignee: BASF Aktiengesellschaft, Ludwigshafen, Fed. Rep. of Germany

[21] Appl. No.: 154,012

[22] Filed: Apr. 11, 1988

[30] Foreign Application Priority Data

Feb. 14, 1987 [DE] Fed. Rep. of Germany ... 8702289[U]

[51] Int. Cl.$^5$ .................. B65D 85/30; B65D 85/57
[52] U.S. Cl. ..................... 206/45.13; 206/45.15; 206/45.18; 206/444; 220/338
[58] Field of Search .......... 206/45.13, 45.15, 45.18, 206/311, 444; 220/337, 338

[56] References Cited

U.S. PATENT DOCUMENTS 4,508,217 4/1985 Long et al.

Primary Examiner—Paul T. Sewell
Assistant Examiner—Jacob K. Ackun, Jr.
Attorney, Agent, or Firm—Keil & Weinkauf

[57] ABSTRACT

A storage container, for example for flat recording media, comprises a lid part (1), a bottom part (2) and a pocket (28) on the lid part (1). The bottom part (2) and lid part (1) are pivotally connected to one another, and the pocket (28) is turnably coupled to the lid part (1). The entire container consists of two parts, the lid part (1) together with the pocket (28) being produced as one piece. To guide the lid part (1) during swiveling and to open the pocket (28) during swiveling, an arcuate edge portion (14) having a elongate guide element (11) is provided laterally on the pocket, the arcuate edge portion and the spreading element entering an arcuate guide (16) with a tangential part for spreading and locking purposes. The manufactured spatial form of the lid part (1) having a pocket front wall (5) offset at an angle is an advantageous special feature. The container is suitable for FlexyDisks®, video disks, gramophone disks, cassettes, etc.

15 Claims, 5 Drawing Sheets

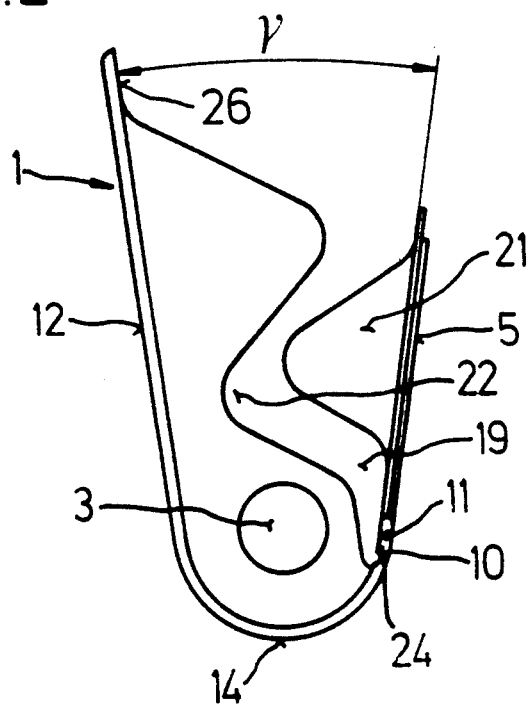
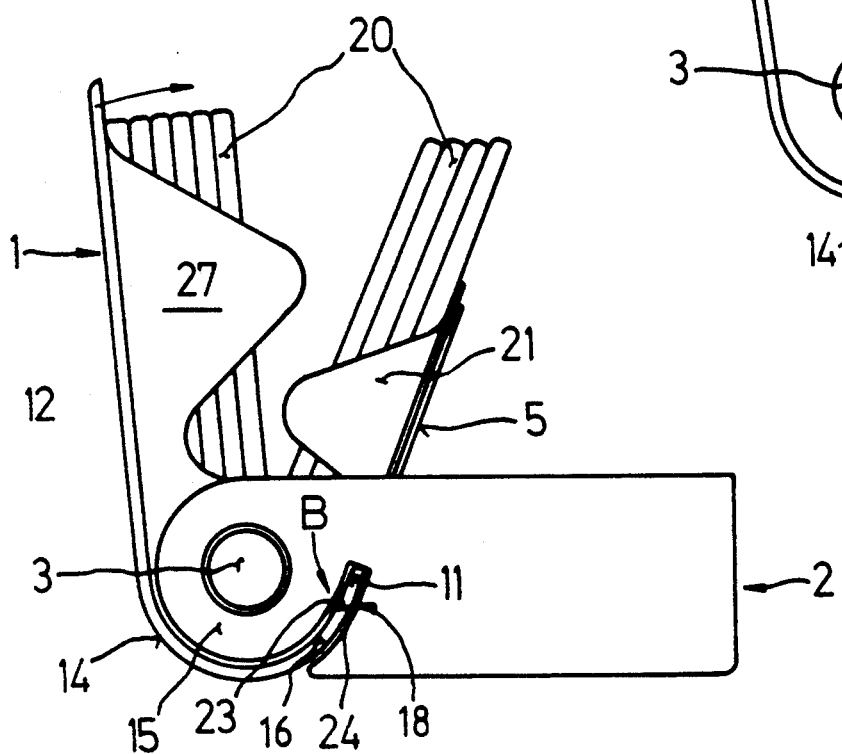
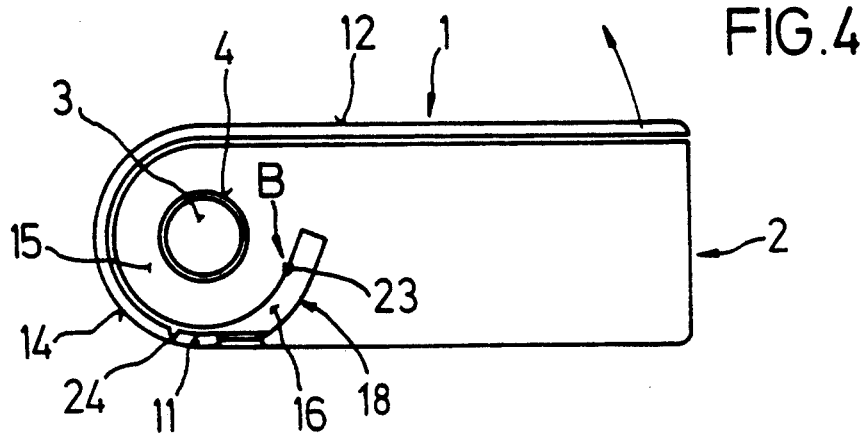

SUBSTANTIALLY RECTANGULAR STORAGE CONTAINER, IN PARTICULAR FOR FLAT ARTICLES

The present invention relates to a substantially rectangular storage container for articles, in particular flat articles, comprising two parts, namely a bottom part, consisting of a base wall bordered on two sides by side walls of the bottom part, and a lid part, consisting of a lid wall at least partly bordered at the sides by side walls of the lid part, and a hinge device between the bottom part and lid part, for pivotal movement therebetween about a pivot axis, the lid part being provided with a pocket formed from the side walls of the lid part, a base wall of the pocket and a front wall, the latter being coupled to the lid part so that it can be swiveled into or out of a substantially parallel position with respect to the lid wall, and the side walls of the bottom part each having an arcuate guide for at least one guide element mounted on each of the side walls of the lid part.

A container of this type for FlexyDisks ®, (®=registered trade mark of BASF Aktiengesellschaft) is disclosed in U.S. Pat. No. 4,496,050, where the container consists of three parts, a box element opening on one side, a lid and a lid flap, and a hinge means is provided both between the box element and the lid and between the lid and the lid flap. The main hinge means is arranged a distance away from the rear wall of the box element, close to its upper edge, to permit the lid part to be raised out of the box. Between the insides of the walls of the box element and the lid, curved guide means are provided, each of which consists of a curved track and a peg and which are intended both to act as a connecting link device for the lid during the upward movement and to open the lid flap. The disadvantages of this known container are the three-part structure, the hinge means, the fact that the parts are difficult to assemble and the large amount of material, since several parts are larger than necessary and some of them are duplicated (e.g. closed position of the container).

German Utility Model No. 8,332,322 equivalent of U.S. Pat. No. 4,676,375, discloses a container whose lid part closes a cut-out in the bottom part and whose joint means has a curved projection on the lid part and a curved groove in the bottom part to permit firm guidance of the lid part during the opening movement.

The bottom and lid parts may furthermore be relatively inseparably interlocked via an undercut edge as a guide groove on the curved projection and a corresponding embodiment of the side wall parts which engage therein. A disadvantage is the fixed pocket on the lid part, which pocket permits the FlexyDisks or other flat recording media to be leafed through only to a limited extent, if at all.

Furthermore, U.S. Pat. No. 4,508,217 discloses a partially foldable container which, like the container described above, possesses a connecting link device between the lid and the box-like body, the guide pins being provided on the lid itself and the opening angle of the lid flap being restricted by a stop on the front wall of the box. Both a movable wall part of the box-like body and the lid flap are connected via a thinner part of the material, also known as film hinge. Although the container can be produced in two parts by injection molding, the individual parts are complicated, are not easy to assemble, consume a relatively large amount of material and, because the movable wall part is raised with respect to the lid, are not protected from unintentional collapse and handling errors. The opening angle between the box and the lid part is about 110° C., as in the first container, resulting in greater instability on two sides.

It is an object of the present invention to improve the container described at the outset so that it can be manufactured in an optimum economical manner and handled safely.

We have found that this object is achieved by a substantially rectangular storage container for articles, described in claim 1 below.

In another advantageous embodiment, the flexible front end portion of the container may be formed as a cut-out portion toward the arcuate edge, at least one bending axis passing through the said cut-out portion. This has the advantage that the container is simple to handle, has a short opening distance and assumes a stable position for use, in which the recording media, which are close together, can be separated from one another without deformation, so that it is easy to read the labels of the individual recording media and the latter can easily be removed from the stack in any position. In another embodiment of the container, the front wall can be provided with conventional side flanges.

In the case of flexible material, for example polypropylene, the one or more bending axes may be realized by a cut-out along the side flange of the front wall.

In the case of other materials, e.g. polystyrene, the bending axis can advantageously be in the form of a thinner groove-like part of the material, i.e. a film hinge. It is also possible to realize a plurality of bending axes by two or more thinner groove-like parts of material close together, in particular in sawtooth form.

A semi-high impact polystyrene having good dimensional stability is an economically advantageous material for the lid part.

The lid part is very advantageously produced having the swivel-open front wall in a position in which the front wall forms an acute angle, in particular less than or equal to 45 degrees, with the lid wall. The front wall should be manufactured to form an angle which is in general about half the maximum swivel-open angle. This special manufactured spatial form allows the maximum bending load on the material to be reduced to about a half, prolonging the life and substantially improving the appearance of the container.

To increase the safety of the open container, a locking means can be provided between the lid part and the bottom part, preventing unintentional swiveling back of the front wall when in a swiveled open for use position. The locking means may advantageously consist of a locking cam on the guide track, the said cam interacting with the recess between the arcuate edge and the elongate guide element. One or more locking means, in particular a hook locking means, can also or alternatively be provided between the side flanges of the front wall and the side walls of the lid part.

It may furthermore be very advantageous if, as in German Utility Model No. 8,332,322, equivalent to U.S. Pat. No. 4,676,375, the arcuate edge of the lid part is in the form of a locking part having a hollow groove, and the side walls of the bottom part partly or completely engage this hollow groove to effect compulsory interlocking of the lid and bottom parts dependent on the swivel angle.

In a version of the container which is just as advantageous, the base wall of the bottom part may have a cut-out which is bordered laterally by the side walls of the bottom part, and the contour of the front wall of the pocket on the lid part can correspond to the contour of the cut-out.

In general, the object of the invention is achieved if the pocket is produced as a single part together with the lid part and has a flexible/elastically coupled front wall which, when the container is opened, ensures good lateral guidance of the lid part in the bottom part and automatically swivels out into a position in which it is possible to leaf through the stack of recording media.

The invention will now be described, by way of example only, with reference to the accompanying drawings, in which FIG. 1 shows a perspective view of a novel container according to the invention in an open state and containing a maximum number of FlexyDisks, FIG. 2 shows a side view of the lid part with a pocket in the position after production, FIG. 3 shows a side view of the assembled container in the open state, FIG. 3a shows a side view of the container with engaged flange locking means, FIG. 3B shows a detailed view of the arcuate guide and spreading elements shown in FIG. 3.

FIG. 4 shows a side view of the container in the closed state,

Figure 1:
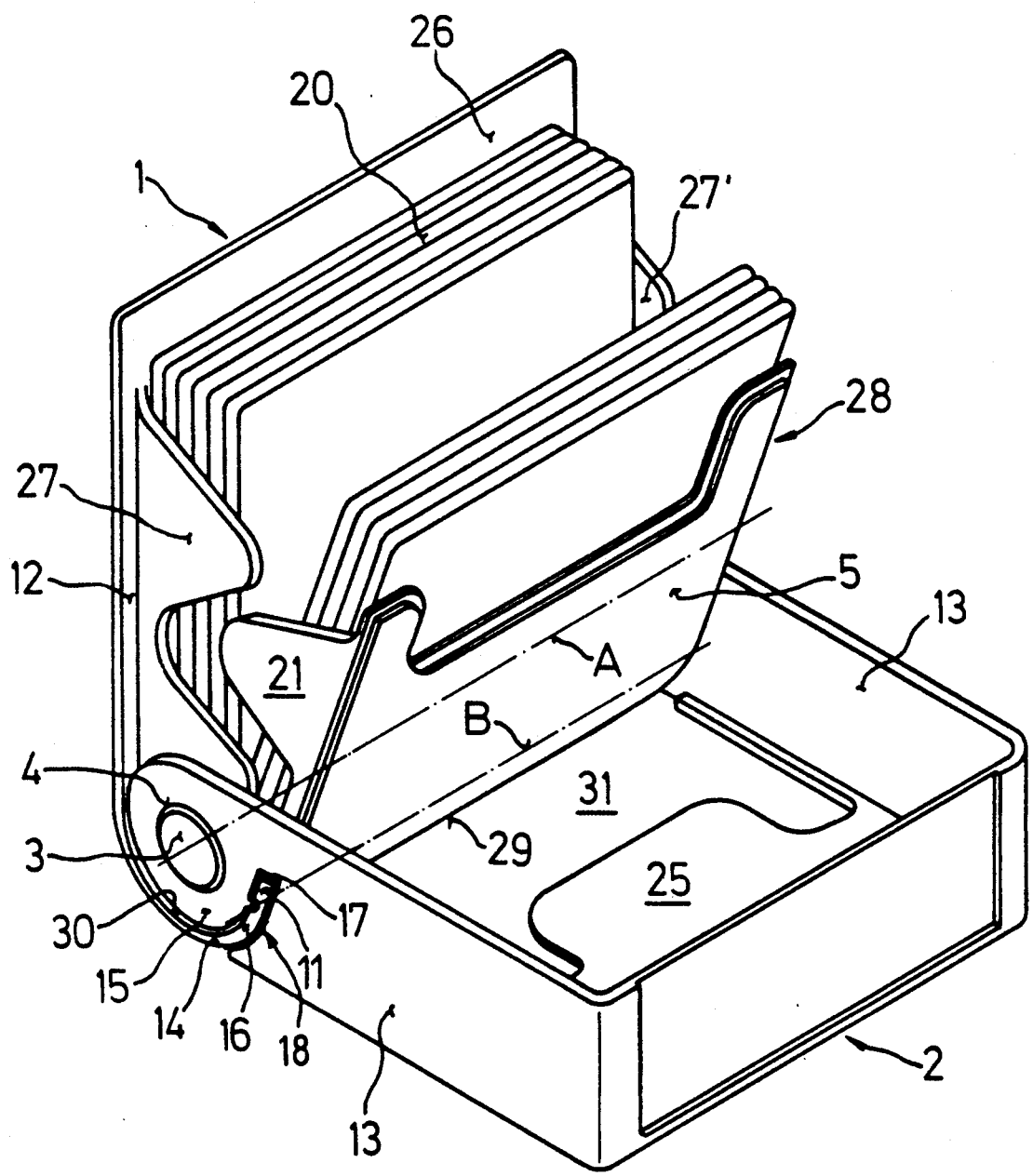
Figure 1B:
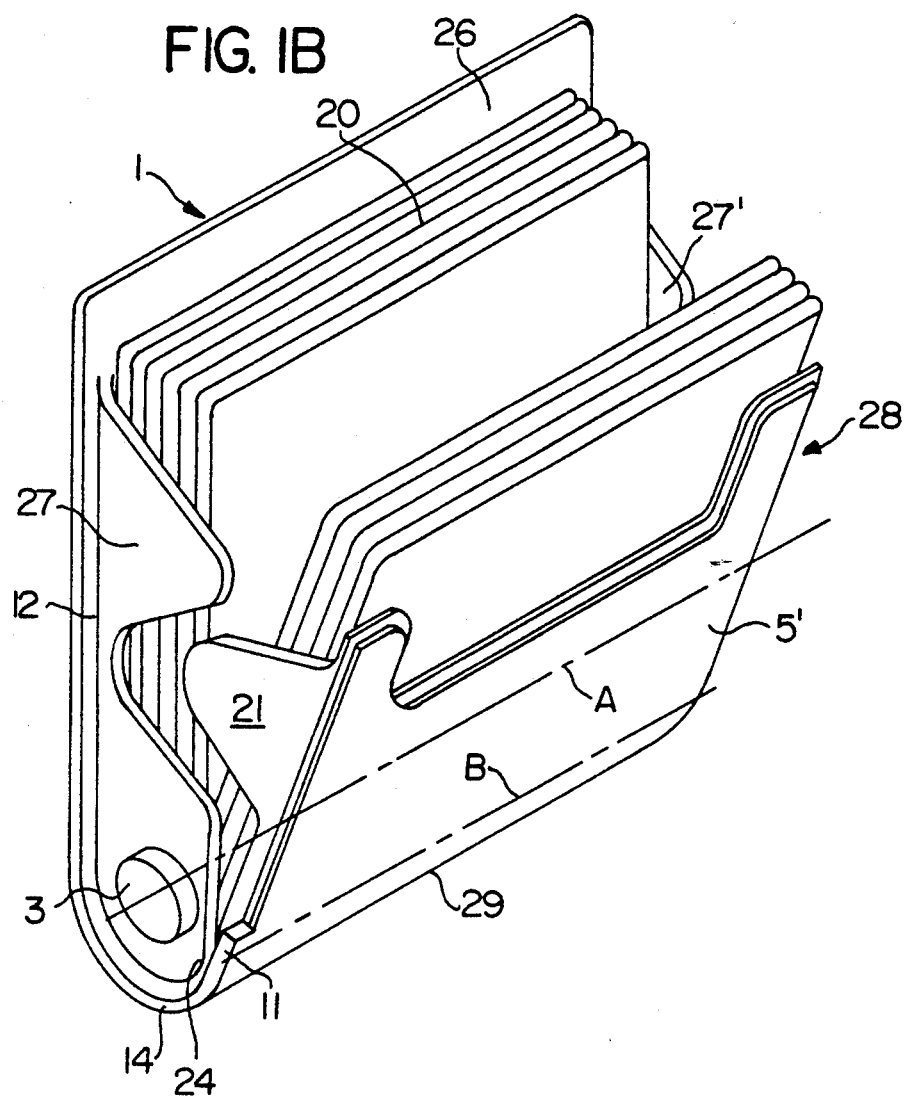

In FIG. 1 there is shown a container which substantially corresponds to the container described in German Utility Model No. 8,332,322, equivalent to U.S. Pat. No. 4,676,375 and comprises a lid part 1 having a pocket 28 for holding recording media 20 of any type, e.g. flat articles such as FlexyDisks, gramophone disks, video disks, hard disks, film or magnetic tape reels, slides, index cards, etc., and a bottom part 2, into which the lid part 1 can be folded more or less completely in a closed position of the container (FIG. 4). The parts 1 and 2 are pivotally joined by a hinge device means comprising a pivot pin 3 on lid part 1 and corresponding holes 4 formed in end parts of side walls 13 of the bottom part. In FIG. 1, the pivot axis is denoted by A and indicated by a dashed line. A base wall 25 of the bottom part 2 has a cut-out 31, into which a part (front wall 5) of the lid part 1 fits and which closes the said cut-out.

The pocket 28 is formed on the one hand by the inside of the lid wall 26, the lid side walls 27, 27' (plus their extensions: the side flange, wall parts 21 on the front wall 5), the front wall 5 and the base wall 29 of the pocket, the said base wall being approximately in the form of a semi-cylindrical shell. The base wall 29 of the pocket becomes the front wall 5 and the side walls 27, 27' of the lid part. On the outside, the lid part 1 possesses, on each of two sides, an outer edge 12 which projects beyond the side wall 27, 27' and ends in an arcuate edge portion 14 (lateral edge of the base wall 29).

Without this edge 12 and 14, it would be possible to swivel the lid part 1 until the outside of the lid wall 26 came into contact with the front edge of the base wall 25, i.e., starting from the closed position, a swivel angle of about 300° would be possible. In the case of a correspondingly easily operating joint 3, 4, the article or articles to be stored could fall out, and the round base wall 29 would make the upright position unstable.

However in practice swiveling of the lid part 1 relative to the bottom part 2 is restricted to about 90°–110° by the arcuate or semi-circular edge 14 which is received within an appropriately dimensioned slot 16 in the side walls 13 of the bottom part.

However, if base wall 29 of the pocket were altered to a flat wall at right angles, it would be possible to set up a secure display position at 90°. A hinge device consisting only of the elements 3 and 4 can also be easily, and therefore unintentionally, separated, and each of the parts 1 and 2 could be lost. Furthermore, there is a danger that the free ends of the side walls 13 and 13' of the bottom part could break off, with the result that the container will be useless.

The last-mentioned disadvantages can be prevented by means of compulsory interlocking of the joint, as described below, with the arcuate edge 14 playing an important role. The arcuate edge 14 possesses a groove (not shown) which runs from the end of the edge 14 around the latter through an angle δ of about 100°. The groove can be in the form of an undercut in the arcuate edge portion 14, i.e. a sloping surface at an appropriate angle, when viewed in cross-section. However, the groove may in principle furthermore have a step-shaped cross-section if the counterpiece of the joint, the second interlocking part, has a complementary step shape.

Where arcuate edge portion 14, as the first interlocking part, has an undercut, the second interlocking part consists of a beveled edge 30 concentric with joint hole 4, the beveled edge 30 running along the concentric slot 16 in the ends 15 of the side walls 13 of the bottom part. The arc length of the beveled edge 30 corresponds roughly to the arc length of the undercut. The undercut of the arcuate edge portion 14 may have a cross-sectional angle of about 45°–90°, preferably 50°–75°, depending on the material.

In the display position of the container in FIG. 1, the entire arc length of the undercut is in contact with the beveled edge 30, hence resulting in a position in which there is the greatest compulsory interlocking.

If lid part 1 is swung toward the closed position, the beveled edge 30 increasingly moves out of the groove; when it has almost left this groove, the arcuate part of the ends 15 of the side wall can be spread laterally away from pin 3, and the lid part 1 and bottom part 2 can easily be separated from one another.

As mentioned briefly above, the arc-shaped slot 16 around the joint 3, 4 (i.e. centred on axis A), with its predetermined length, restricts rotation or pivoting of the lid part 1 with respect to the bottom part 2, since the front end of the arcuate edge portion 14 comes to rest against the slot end 17. The further arcuate edge portion 14 enters the slot 16 during the opening movement of the lid part 1, the greater will be the engagement between side walls 13 of the bottom part and the lid part 1.

Figure 5:
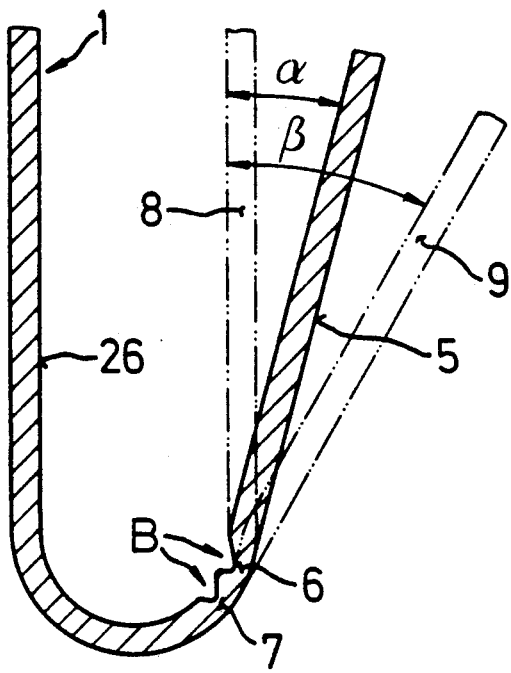
FIG. 5 shows a partial section through the lower part of the lid part having a pocket with a two-groove film hinge.

To permit the front wall 5 to swivel out or open with respect to the lid wall 26, a certain degree of flexibility and/or elasticity is necessary in a transverse region of the front wall 5 and/or of the base wall 29. In this context, the term bending axis is used below, the bending axis or axes being denoted by B in all embodiments. By way of example, the front wall 5 may be flexibly connected to the base wall 29 of the pocket by means of one hinge (FIG. 6) or two or more hinges 6, 7 (FIG. 5). In these cases, each hinge is in the form of one or more cross-section constrictions which may have different cross-sectional shapes and widths.

Figure 7:
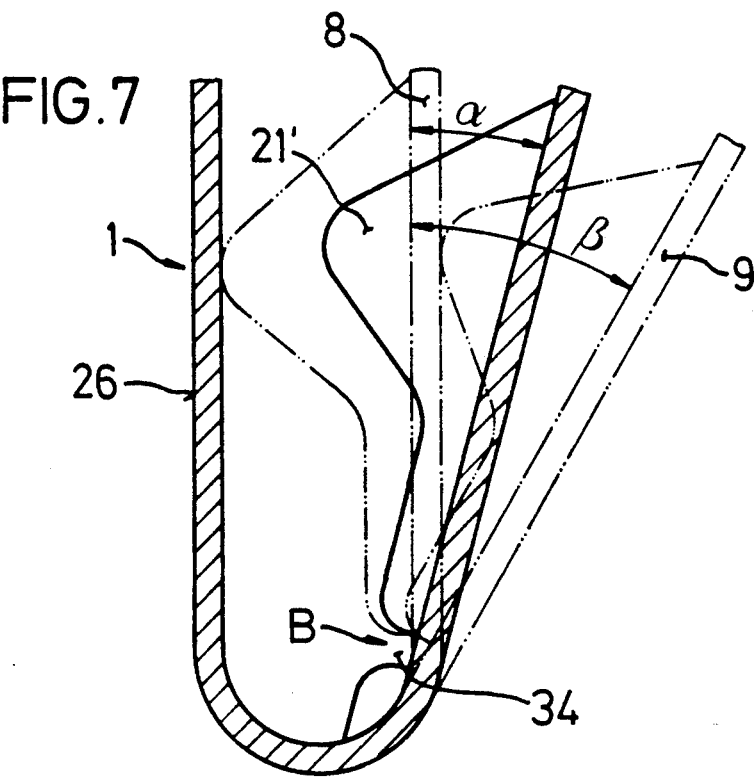
FIG. 7 shows a partial section similar to FIG. 5 and 6, having a flange cut-out as a hinge.

In the embodiment shown in FIG. 7, a specific cut-out 34 is provided in the side flange 21' and this achieves a bending axis on account of the low resistance to bending in the cut-out region. However, a precondition of this embodiment is a certain degree of resilience of the pocket material which is achievable, for example, if the pocket is made of polypropylene.

Figure 6:
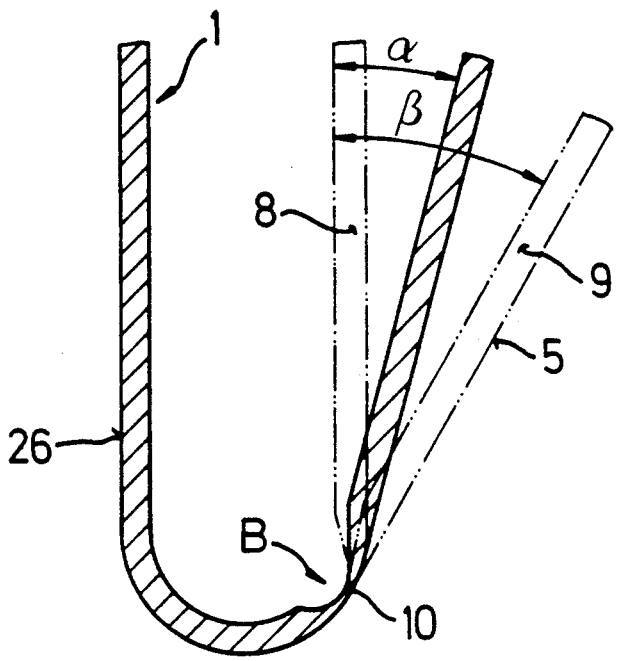
FIG. 6 shows a partial section similar to FIG. 5 but with a single-groove film hinge.

The hinge ("film hinge") embodiments of FIGS. 5 and 6 can, in comparison, be achieved using a more economical material, preferably a semi-high impact polystyrene, e.g. type 427 D, a commercial product from BASF Aktiengesellschaft. This material has a tensile strength of 42 N/mm$^2$, a modulus of elasticity (tensile test) of 2,800 N/mm$^2$ and high dimensional stability. This material was tested favorably in bending tests in comparison with other semi-high impact polystyrene grades, e.g. 472 C, which has a higher butadiene content and is likewise a product of BASF Aktiengesellschaft. The bending tests were used to test crazing and dimensional stability during injection molding. Crazing is designated as a white coloration of a material of another color in the region of the bending axis, the flexibility/resilience being retained and no mechanical fracture occurring. In principle, other thermoplastics may also be used for each purpose, depending on the stress to which the bending parts are subjected.

Figure 3B:
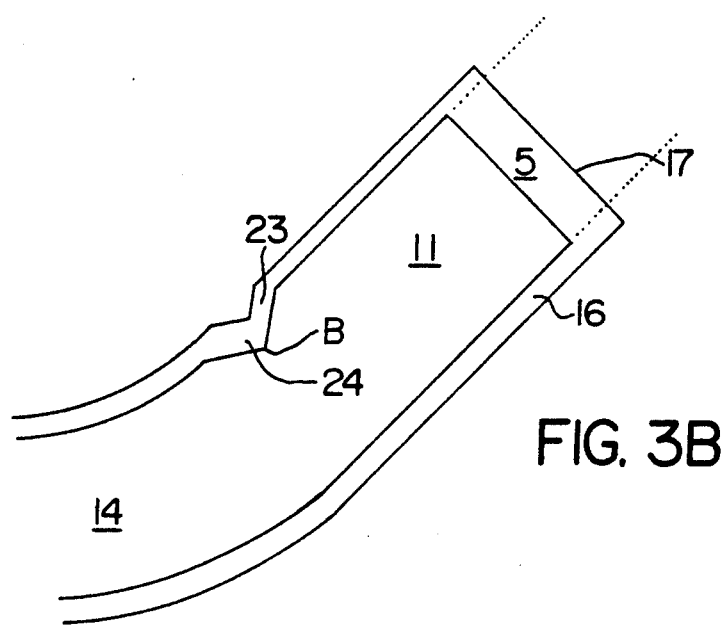
Figure 3A:
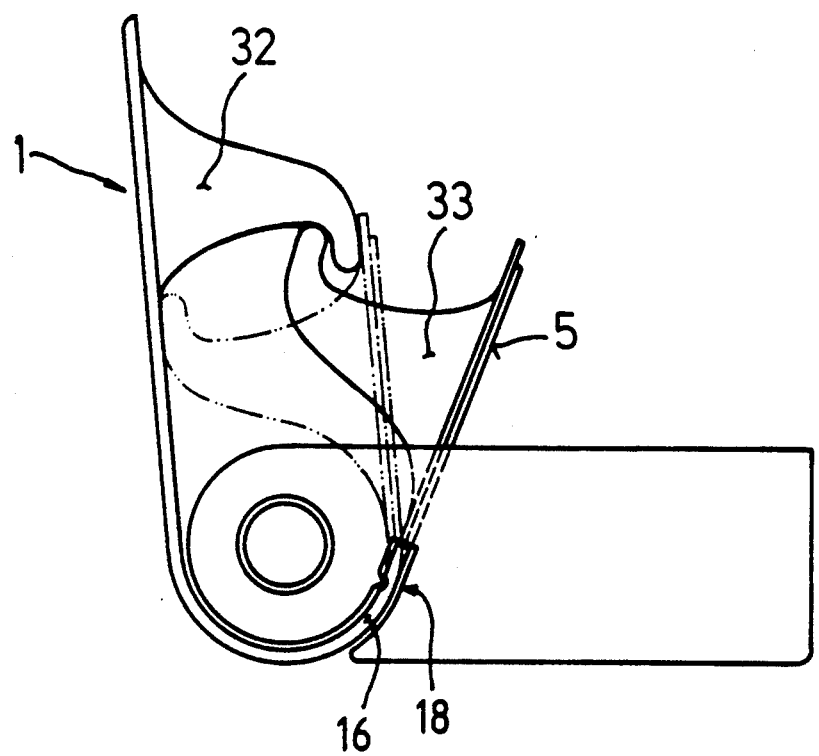

For the purposes of the present invention, a two part guide element for the arcuate guide is provided comprising the arcuate edge portion 14 and a elongate guide element 11, with a cut-out in between. In FIGS. 2 and 3, the cut-out is the reduced cross-section designated 24, for example at the end of one of the (film) hinges 6 and 7 or 10. Such a reduced cross-section 24 between the arcuate edge portion 14 and the elongate guide element 11 is also required in the embodiment of FIG. 7; although no special reduced cross-section over the entire length or bending axis B is required there. In FIGS. 1 to 3, the elongate guide element 11 (it may also be cylindrical) which guides the spreading movement of the pocket 28 by its contact with the tangential part 18 of the slot 16, is part of the side of the front wall 5 which extends the arcuate edge portion 14 in the tangential direction.

When the container is opened from the closed position in FIG. 4 into the open position in FIG. 3, pivoting the lid part 1 upward about the swivel axis A causes the guide element 11 to enter an arcuate or curved part of the slot 16, which curved slot part runs concentrically with respect to the swivel axis A and, as a result of appropriate dimensioning, does not exert any force on the guide element. After the lid part 1 has been swivelled open about 30° in the example shown in FIGS. 3 and 4, otherwise in the region of <45° before the maximum opening angle is reached (in this case about 95°), the element 11, which has been guided through the arcuate part of the slot 16, enters a tangential part 18 (cf. FIG. 4) of the slot 16. On further swiveling of the lid part 1, a radial force is exerted on the guide element 11 when the latter enters the tangential part 18. Since the guide element 11 is merely an extension of the front wall 5, this results in the entire front wall 5 being forced forwrad and swiveled away from the lid part 1. This expands the pocket 28 in such a way that the recording media 20 can be fanned out in the manner shown in FIGS. 1 and 3. This provides the user with better legibility and facilitates removal of individual recording media 20.

The guide element 11 in this case is advantageously elongate and should be at a defined distance from the hinge (bending axis B), so that the front wall can be opened via a lever arm of appropriate size. However, it is also possible for the leading edge or front end of the arcuate edge portion 14, i.e. the end part which is the first to enter the slot 16, to be flexible so that it is not connected to the pocket 28 but is movable through a partial slot in its longitudinal direction. (The slot extends between the end part and the pocket 28.)

To permit the front wall 5 to be swiveled open at all, the side walls 27, 27' of the lid part are designed so that they can be separated. Although in principle any shape is possible, in the present embodiments each side wall is separated by a wavy joint, so that roughly sinusoidal spaces 19 are formed between side flanges 21 on the front wall 5 and recesses 22 on the lid part 26. Even when the front wall 5 is in the completely open position, wall parts 21 still partly extend into the recesses 22, preventing, in a conventional manner, any recording media 20 contained in the pocket 28 from falling out sideways or becoming jammed.

Modern thermoplastic materials have flexural properties which readily permit hinges of the types shown in FIGS. 5 and 6 to be designed to perform the relevant function. However, to keep the bending load on the material as low as possible, the lid part 1 is designed so that in the position after manufacture, the front wall 5 is roughly in the middle of the total bending angle B, i.e. between the fully closed state 8 or closed position and the fully open state 9 or open position. FIG. 2 shows the lid part 1 in this middle position after manufacture. Thus, on pressing together into the closed state 8 and spreading apart into the open state 9, the hinge device and the front wall 5 always move from the rest position to the end position through only half the distance. The danger of fatigue fracture or the occurrence of crazing is thus at least reduced, and economical production in one piece from economical commodity thermoplastics, preferably polystyrene 427 D (see above), is possible.

To prevent the lid part 1 when in the open position from accidentally pivoting (swiveling back) into the closed position when recording media 20 are being moved, a locking stud 23 is provided in slot 16. The stud 23 interlocks with the reduced cross-section 24 formed, for example, by the hinge 10 between the lid part 1 and the front wall 5.

It is of course also possible for the wall parts and recesses to be designed with hook-shaped locking means 32 and 33 (shown in FIG. 3a) which engage to form a positive connection and are intended for limiting and locking the swivel movement, or for suitable locking means to be provided between partially overlapping surfaces between the side walls 27, 27' of the lid part and the side flanges of the front wall 5. The hook embodiment of the locking means 32 and 33 has the great advantage that recording media furthermore cannot partially come between the wall part and the recess and thus be damaged. FIG. 2 shows the special embodiment of lid part 1, which is substantially protected from bending loads. The angle Y between the lid wall 25 and the front wall 5 is 15°, i.e. corresponding to half the angle $\beta$ and the full angle $\alpha$.

We claim:

1. A substantially rectangular storage container for articles, in particular flat articles, comprising two parts, namely a bottom part, consisting of a base wall bordered on two sides by side walls of the bottom part, and a lid part, consisting of a lid wall at least partly bordered at the sides by side walls of the lid part, and a hinge device between the bottom part and lid part, for pivotal movement therebetween about a pivot axis, the lid part being provided with a pocket formed from the side walls of the lid part, a base wall of the pocket and a front wall, the latter being coupled to the lid part so that it can be swiveled into or out of a substantially parallel position with respect to the lid wall, and the side walls of the bottom part each having an arcuate guide for at least one guide element mounted on each of the side walls of the lid part, wherein the lid part together with the pocket are produced as a single piece, at least one bending axis being provided parallel to the pivot axis of the container parts, and in the front wall or the base wall of the pocket, and the arcuate guide ends in a tangential part, and at least one guide element on the side walls of the lid part is in the form of an arcuate edge portion having at the front end thereof an elongate guide element with an flexible front portion, wherein there is a cut-out portion between the elongate guide element and the side arcuate edge portion enabling flexing of the flexible front portion, at least one bending axis (B) extending into the cut-out portion, the arcuate edge remaining in the arcuate part of the arcuate guide of the bottom part in order to guide the lid part, and the elongate guide element, on entering the said tangential part of the arcuate guide, causing the front wall of the pocket to swivel out into its open position.

2. A container as defined in claim 1, wherein the front wall is provided with side flanges.

3. A container as defined in claim 2, wherein, the lid part consists of flexible material and at least one bending axis is formed by a cut-out along the side flanges of each side of the front wall.

4. A container as defined in claim 1, wherein at least one bending axis is formed by a thinner groove-like part of the material.

5. A container as defined in claim 1, wherein at least one bending axis is formed by at least two thinner groove-like parts of material.

6. A container as defined in claim 1, wherein the material of the lid part is a semi-high impact polystyrene having good dimensional stability.

7. A container as defined in claim 1, wherein the lid part is manufactured having the swivel-out front wall in a position in which the front wall forms an acute angle with respect to the lid wall.

8. A container as defined in claim 7, wherein the angle position of the front wall for manufacture thereof corresponds to about half the maximum swivel-open angle.

9. A container as defined in claim 1, wherein a locking means is provided between lid part and the bottom part, the said locking means preventing unintentional swiveling back of the swiveled-open front wall.

10. A container as defined in claim 9, wherein the locking means comprises a locking cam on the arcuate guide, the said cam interacting with said cut-out portion between the arcuate edge portion and the elongate guide element.

11. A container as defined in claim 1, wherein the front wall of the pocket is formed with side flanges and at least one locking means is provided between said side flanges and the side walls of the lid part.

12. A container as defined in claim 1, wherein the arcuate edge of the lid part is undercut to form a part-circular groove therein as a first interlocking part, and the end of the side walls of the bottom part on the sides facing the lid part (1) have a second interlocking part which is complementary to the first interlocking part to effect compulsory interlocking of the lid and bottom parts, dependent on the angle of rotation.

13. A container as defined in claim 1, wherein the base wall of the bottom part has a cut-out which is bordered at the sides by the side walls of the bottom part, and the contour of the front wall of the pocket of the lid part corresponds to the contour of the cut-out.

14. A container as defined in claim 5, wherein the at least two groove-like parts of the material form a saw-tooth shape.

15. A container as defined in claim 7, wherein the acute angle is less than or equal to 45°.

* * * * *